(12) United States Patent
Bjernetun et al.

(10) Patent No.: US 9,234,759 B2
(45) Date of Patent: Jan. 12, 2016

(54) METHOD OF ENRICHMENT OF ROAD INFORMATION DATA

(75) Inventors: Johan Bjernetun, Göteborg (DE); Anders Eriksson, Torslanda (SE)

(73) Assignee: Volvo Lastvagnar AB, Göteborg (SE)

( * ) Notice: Subject to any disclaimer, the term of this patent is extended or adjusted under 35 U.S.C. 154(b) by 171 days.

(21) Appl. No.: 13/991,107

(22) PCT Filed: Dec. 1, 2010

(86) PCT No.: PCT/EP2010/007288
§ 371 (c)(1),
(2), (4) Date: Jul. 3, 2013

(87) PCT Pub. No.: WO2012/072094
PCT Pub. Date: Jun. 7, 2012

(65) Prior Publication Data
US 2014/0324337 A1    Oct. 30, 2014

(51) Int. Cl.
G01C 21/26    (2006.01)
G06F 17/30    (2006.01)
G09B 29/00    (2006.01)
B60W 50/00    (2006.01)
G01C 21/32    (2006.01)

(52) U.S. Cl.
CPC .......... *G01C 21/26* (2013.01); *B60W 50/0098* (2013.01); *G01C 21/32* (2013.01); *G06F 17/30* (2013.01); *G06F 17/30241* (2013.01); *G06F 17/30702* (2013.01); *G09B 29/00* (2013.01); *G09B 29/004* (2013.01); *B60W 2050/0078* (2013.01); *B60W 2050/0088* (2013.01); *B60W 2050/0091* (2013.01); *B60W 2530/14* (2013.01); *B60W 2550/402* (2013.01)

(58) Field of Classification Search
CPC ......... G01C 21/26; G06F 17/30; G09B 29/00
USPC .......................................................... 701/450
See application file for complete search history.

(56) References Cited

U.S. PATENT DOCUMENTS 6,157,891 A * 12/2000 Lin ................. 701/301
6,470,265 B1 * 10/2002 Tanaka .............. 701/532
6,856,902 B1 * 2/2005 Mitchem .............. 701/487

(Continued)

FOREIGN PATENT DOCUMENTS

DE    19948734 A1    4/2001
DE    10337634 A1    3/2005

(Continued)

OTHER PUBLICATIONS

Japanese Official Action (Feb. 4, 2015) (translation) for corresponding Japanese Application 2013-5411212.

(Continued)

*Primary Examiner* — James Trammell
*Assistant Examiner* — Majdi Alsomiri
(74) *Attorney, Agent, or Firm* — WRB-IP LLP

(57) ABSTRACT

Road information data is enriched and a vehicle drive train is controlled on basis of this data. Based on vehicle position, data about possible routes which may be taken is collected from at least three sources (A, B, C). Data with the highest quality is chosen for controlling the drive train. When running, information about the traveled route is recorded and saved, thus providing a continuous update.

15 Claims, 1 Drawing Sheet

(56) References Cited

U.S. PATENT DOCUMENTS

| | | |
|---|---|---|
| 7,007,011 B1* | 2/2006 | Joshi |
| 2006/0097859 A1* | 5/2006 | Nordbruch .................. 340/440 |
| 2007/0005609 A1* | 1/2007 | Breed ............................ 707/10 |
| 2007/0198176 A1* | 8/2007 | Endo et al. ................... 701/208 |
| 2008/0221776 A1 | 9/2008 | McClellan |
| 2009/0300053 A1 | 12/2009 | Denaro |

FOREIGN PATENT DOCUMENTS

| | | |
|---|---|---|
| DE | 102005049458 A1 | 4/2007 |
| DE | 102008025852 A1 | 12/2009 |
| JP | 2004170248 | 6/2004 |
| JP | 2009006889 | 1/2009 |
| JP | 2010197083 A | 9/2010 |

OTHER PUBLICATIONS

Japanese Official Action (Aug. 27, 2014) (translation) for corresponding Japanese Application 2013-5411212.

International Search Report (Aug. 12, 2011) for corresponding International application No. PCT/EP2010/007288.

* cited by examiner

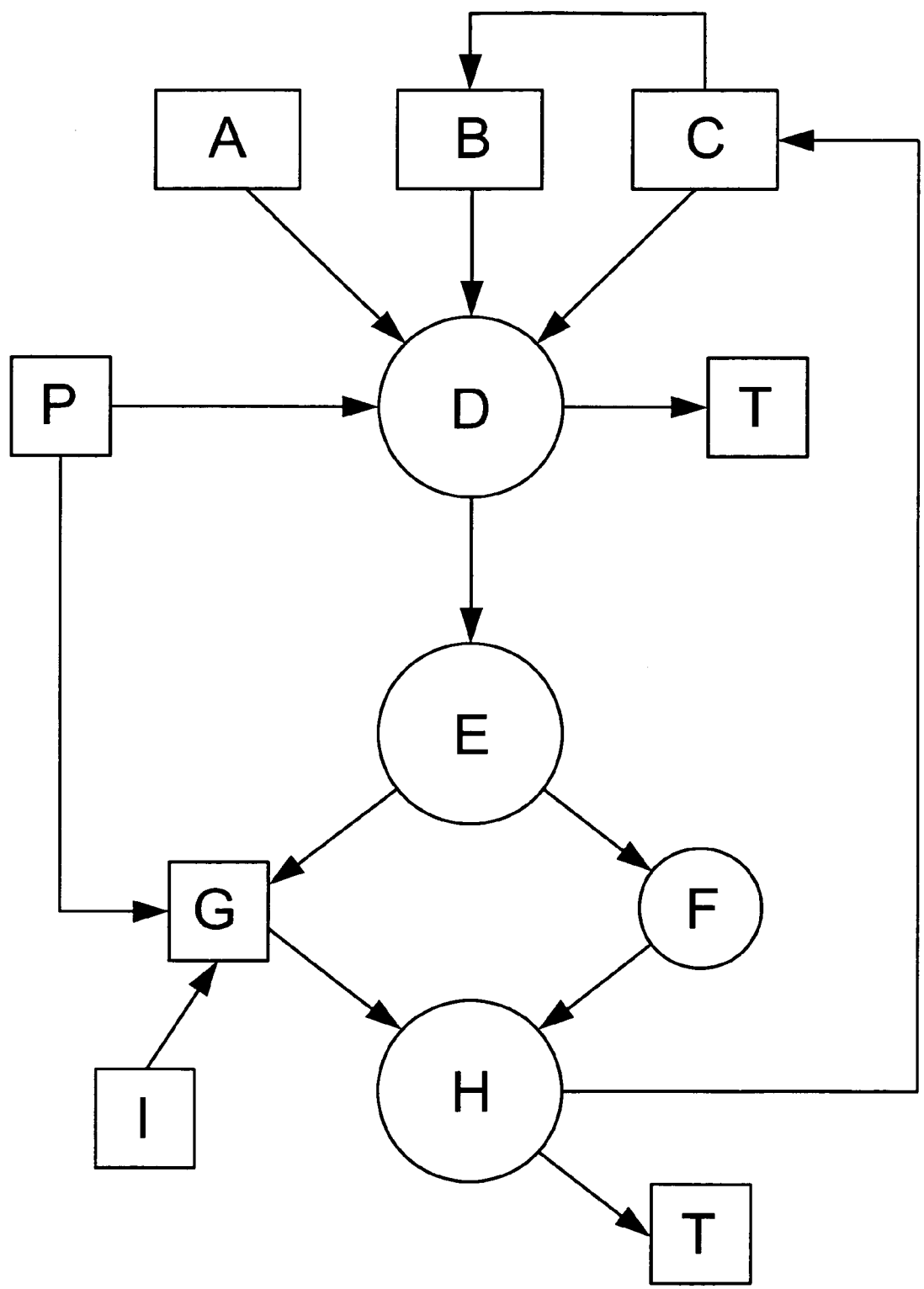

METHOD OF ENRICHMENT OF ROAD INFORMATION DATA

BACKGROUND AND SUMMARY

The invention relates to method of enrichment of road information data, and using said road information data to control a drive train of a vehicle.

Methods for using maps and databases for navigating a vehicle are commonly known. These methods using systems having access to one source of road information data such as a map or a recording from vehicles which previously have been driving the same route.

The road information data is used to control the drive train, for example, such that a better performance or an environmental friendly driving or higher comfort is achieved.

The problem with these methods is that the road information data is aging and might become out of date, for example if a stretching of a road has been changed, the previously recorded road information data is not relevant any more, whereby the drive train is controlled in a manner that probably not achieves the desired objectives. A further problem is the coverage of the road information sources. No source covers all possible routes, the smaller and the more recent constructed a road is, the higher is the probability that the road information data source does not include any data about the desired road. This is a problem especially for timber trucks, which travel long distances on common roads, but also on very small and new established roads far from the common road network.

It is desirable to overcome the above mentioned problems and thereby suggest a method that enriches road information data, such that a vehicle has as high probability as possible to access relevant road information data of an upcoming route of the vehicle.

A drive train and other systems of a vehicle are controlled by an electronic control unit (ECU), and according to the inventive method the ECU uses the road information data to control at least one parameter of the vehicle, especially a parameter of the drive train. An optimised control of the vehicle depending of the topography of an upcoming route can thereby be performed.

The ECU having access to road information data from a plurality of different types of road information sources, wherein the road information sources at least comprises a digital map, a fleet database and a local vehicle database. The ECU is adapted to make a selection between road information data from the plurality of road information sources, wherein said selection is based on a data quality rating of the road information data from the different road information sources.

The digital map is any commercial or industry generated digital map, based upon topographic data. The map would thereby at least provide for the route of a road in latitude, longitude and elevation. Such digital maps are commonly known and for example used in vehicle navigation systems.

The fleet database comprises road information data recorded by a plurality of vehicles and transmitted to and saved into the fleet database. The more vehicles that records road information data into such a fleet database, the faster the database is filled, and the fleet database thereby also becomes a greater selection of routes. The ECU must not necessary have a direct connection to the fleet database, when it has access thereto it can access relevant road information data and store it in a local memory. Obviously a wireless connection over GPRS or similar is preferable to maintain a high flexibility in the system.

The local vehicle database just comprises road information data that has been recorded by the vehicle itself.

The road information data in the road information data sources is tagged with a quality rating. The quality rating reflects the relevance of the road information data and facilitates an evaluation of the road information data from the different road information data sources, such as a selection there between can be made.

The ECU further has access to a vehicle position sensor, wherein the vehicle position sensor can be any kind of positioning device, enabling a vehicle positioning, for example a satellite based navigation system or an inertial navigation system or any other suitable positioning determining device.

The position sensor can also be complemented by a navigation system, which can be any kind of navigation system enabling a planning of an upcoming route. Said navigation system can be of a black box type, just used for the control of the vehicle or it can also be used by and used to inform an operator of the vehicle.

The inventive method comprising the steps of
determining a position of the vehicle,
collecting road information data, about possible routes in surroundings of the position of vehicle, from the plurality of road information sources (A, B, C),
evaluating the data quality rating of the collected road information data,
selecting the mad information data with the highest data quality rating, and
controlling at least one parameter in the drive train dependent of the selected road information data,
registering, road information data about the route as the vehicle is moving, and during move of the vehicle, performing, the steps of;
making a selection of relevant recorded road information data, and
saving said relevant road information data to the local database (C).

The position of the vehicle is determined with the earlier described position sensor. The same sensor is used by the ECU to register the position of the vehicle when the vehicle is moving. Further, information of an inclination of the road is also registered. For this purpose, an inclination sensor in a transmission of the vehicle or any other means to detect an elevation can be used. A selection of relevant registered road information data is made, to filter out incomplete or otherwise defect registered data. The selected data is then saved into the local database, from which it can be accessed by the ECU during the next drive along the same route.

The inventive method has the advantage that the ECU can choose from a plurality of road information data sources, and use the one with the highest quality. Especially, the road information data the ECU can access is enhanced, because the traveled route of the vehicle is recorded and saved into the local database, such that always fresh road information data is accessible. If neither of the accessible road information sources comprises any relevant road information data, the drive train cannot be controlled dependent on any road information data. However, since the traveled route is recorded and saved in the local database, the ECU will have access to road information data, next time the vehicle travels the same route. The inventive method is preferably repeated continuously.

It is preferred that the position sensor, does not only decide the position of the vehicle, but also determines a direction of travel of the vehicle. By using the information about the direction of travel of the vehicle, the ECU must not collect road information data about all the routes in the surrounding, instead just the routes in the direction of travel is collected.

In the inventive method the road information data is tagged with a quality rating. The quality rating enables an evaluation of the road data from the different road information data sources, whereby a selection of the road data with the highest quality rating, can be made. The quality rating is based on different criteria, wherein these criteria at least comprises one of following
- the source of the road information data and/or
- the age of the road information data, and/or
- the amount of records a mean value of the road information data is based upon, and/or
- the spread of a mean value of the road information data and/or
- the deviation between an expected outcome of the control of the at least one vehicle parameter and an actual outcome of the control of the at least one vehicle parameter.

The road information data from the different road information sources have different priority order; the priority order is decided by the quality rating. Road information data with higher quality rating has precedence before road information data with a lower quality rating.

To enable a rating based on the age of the road information data, is the road information data saved in the local database, together with its correspondent date of recording.

The different criteria can be weighted, such that one or some of the criterions has/have a higher influence of the final quality rating. This allows a selection of the road information data with the highest quality, i.e. comprises the most relevant information about the upcoming route.

Not all pans of a road involve such topographic that a planning of the driveline strategy is required to achieve optimal values for performance and/or comfort and/or environmental friendly driving. Therefore it is suggested that the road information data for a route is saved in portions. Whereby just those portions where a change in inclination and/or the direction of the road fulfil predefined conditions in change of inclination and/or direction are saved in the local database. Thereby it is not necessary to occupy physical and digital storage space with irrelevant information and the internal database can be made smaller, whereby costs are saved.

The second time the same road or portion of a road is saved into the local database, a mean value of first and second road information data is created. This procedure is repeated each time the same route or portion of a route is recorded and saved into the local database. Hence, if the local database includes several recordings of the same route, a mean value of that route is formed from said several recordings. Using a mean value instead of just one recording assures more relevant road information data, because the mean value reduces the influence of variations in the recordings, such as outer circumstances and problems with sensors during a specific recording.

When calculating a mean value it is possible to weigh the most recent recording higher than an older recording, whereby the recent recording becomes a higher relevance in the mean value.

In the data quality rating the quality of a mean value can be rated, whereby a mean value with a low spread between the individual recordings becomes a higher data quality rating than a mean value with a higher spread between the individual recordings. This can be applied for mean values in the local database as well for mean values origin from the fleet database.

The different criteria for the road information data can be used individually or combined in any combination with one or several other criteria to create a final value of the data quality rating.

To assure that relevance of the mean value, such that it does not get contaminated with erroneous recordings, a comparison between the current mean value and newly recorded road information data is made before the newly recorded data is integrated into the mean value. Whereby, if the most recent recording of a route differs more than a predefined percentage from a mean value of the road information data for said route, said new recording is not included in the mean value, wherein said most recent recording is saved separately.

However, if the route actually has changed the mean value obviously must be updated. A change of the route is thereby certified in that, if both the most recent and the predetermined number of earlier recordings of a route differs more than a predefined percentage and about equally much from the mean value, a new mean value is calculated from the most recent and the number of earlier recordings of said route. Whereby the previous mean value can be discarded.

To enhance also the date in the fleet database, saved road information data is transferred into existing road information data about the route of interest, in the local database. This transfer of data can be made continuously or when the vehicle arrives at a transit station or during service or at an other suitable moment and location. Whereby the data transfer can be made wirelessly or by cable with suitable means therefore.

A mean value from a high number of recordings is seen as more reliable as a mean value with a lower number of recordings. Thereby, in the data quality rating, a mean value from a higher number of recordings becomes a higher data quality rating than a mean value based upon a lower number of recordings.

To eliminate erroneous recordings, the outer conditions during driving of the vehicle are taken into consideration in the recording. Such outer conditions can be wind, snow, rain and traffic conditions.

The inventive method allows the ECU to control the drive line of the vehicle such that it performs optimal according to predefined criterions. These criterions can be optimal performance regarding comfort, power, eco driving etc. Thereby can the engine control strategy and/or the gear shift strategy of an automatic transmission of the drive train be a function of the topographic of the upcoming route. Such a control of the drive train is preferably implemented during an activation of a cruise control of the vehicle, whereby the method thereby comprises the steps of changing the set speed of the cruise control dependent of the selected road information data.

BRIEF DESCRIPTION OF THE DRAWING

The invention is hereinafter explained and described in conjunction with the enclosed drawing, on the basis of an embodiment of the invention from which further features and advantages of the invention can be out read.

FIG. 1 shows a flowchart of the inventive method.

DETAILED DESCRIPTION

The flowchart in FIG. 1 discloses the main features of the inventive method. The boxes symbolises a source of information, such as a database, memory or sensor, the circles symbolises an event and the arrows symbolises a flow of information. The boxes A, B, C symbolises three different sources of road information data. However, the method starts in the circle D, in which information about the position of the vehicle is collected from the position sensor P, evaluated and selected. The positions sensor P is preferably a GPS or corresponding device.

When the position of the vehicle is determined, road information data about possible upcoming routes is collected from the road information data sources A, B, C. All road information data comprises at least information about the inclination of the road for the upcoming route.

The road information data about a route is preferably divided into portions. Wherein one portion comprises information about a road segment including inclination changes of the road. Memory space can thereby be saved, since portions of a road without any major changes in inclination can be left out in the road information data. This can be done, because when the road does not have any changes in inclination the vehicle mostly travels in a constant speed, wherein the driveline does not need any prediction of the upcoming route. The method therefore constantly updates the position of the vehicle and collects relevant road information data from the road information sources A, B, C. Since the position is constantly updated, the direction of travel for the vehicle will be known, whereby the collection of road information data can be limited to just road information data in the direction of travel of the vehicle.

Collected road information data that has been evaluated and deemed not be used, are discarded T.

The evaluation and selection of the road information data is made based upon a quality rating of the road information data. The quality rating is based on one or several criterions, such as the source A, B, C, of the road information data, elapsed time since recording of the road information data, outcome of the use of a driveline function based on the road information data, etc.

For example, if road information data from the local database C is available, this road information data has priority over road information data from the fleet database B and/or the digital map A, wherein the road information data from the fleet database B has priority over road information data from the digital map A.

A further example of a possible criterion is the time since the road information data is recorded, wherein the quality rating of the road information data is decreasing with a predefined number for every time unit (days, months or years) that has lapsed since the recording.

When the most suitable road information data is selected, in the circle D, based on the quality rating, the drive train is controlled, in the circle E, dependent on the selected, road information data. Preferably, a cruise control of the vehicle is activated, whereby predefined functions F in the drive train is selected and executed dependent of the topography of the upcoming route. Such functions can be:
- allowing a deviation from the set speed of the cruise control of the vehicle,
- avoid or postpone a gear shift, and
- avoid a breaking of the vehicle.

When the functions F above and other similar functions are activated the vehicle uses the upcoming route to optimise the performance of the vehicle. The uses of these functions F are dependent of that the road information data is correct.

Even though the use of the road information data can be greater during an activation of a cruise control, it is not limiting, for the invention. The controlled parameter during manual driving of the vehicle can be torque limitation or activation of a generator or other system in the vehicle, when it is topographically beneficial.

As a part of the enhancement process of the invention, when such a function F has been used, an evaluation of the actual outcome of the function is made and compared with an expected outcome of the function F. If, the actual outcome of the function F does not correspond to the expected outcome, the data quality rating of the road information data used is decreased. The outcome can be measured and compared as the function is executed and/or as the function has been executed. A suitable parameter for evaluation of the outcome of the function could be the expected and actual speed of the vehicle in a certain point, for example on the top of a hill. How much the data quality rating is decreased is dependent on the deviation from the expected outcome. Thereby, a great deviation between the actual and expected result might have the consequence that another source of road information data is used the next time a selection of road information data is made for the same route. The invention is however not limited to the above briefly and previously known describe functions F, an evaluation of the quality of the road information data can be made with any other function F that is dependent of topographic road information data.

If a comparison between an actual value and an expected value is such that a data quality rating is changed thereby, the road data with its new mad data quality rating is saved H.

Further, during travelling along a route, a recording G of the route is made. The recording becomes its input from the position sensor P and other input sources I, which at least comprises an elevation sensor (inclination sensor, gps or other suitable devices), wherein also other parameters can be recorded, such as the sensing form vehicle sensors and external devices, weather and wind sensors etc.

The circle H represents an evaluation of the recorded and used road information data. A decision if a recording of road information data of a route should be saved into the local database C or discarded T is made in the circle H. The recoding is saved, if:
- there are no existing road information data of a route in the local database C, and the recorded road information data does not show any signs of being corrupt, or
- a used mean value of road information data from the local database C, have generated a deviation greater than a predetermined threshold value, between an actual outcome and an expected outcome of a function F, and/or
- the recorded road information data deviates less than a predetermined threshold value from a mean value saved in the local database, and/or
- the recorded road information data deviates more than a predetermined threshold value saved in the local database, wherein the recorded road information data in this case is saved separately.

In the circle H is an evaluation of the execution of a function in F made. If it turns out that the actual outcome of a function deviates more than a predetermined threshold value, from an expected outcome, the quality rating of the used road data information can be made.

A recorded road information data is just integrated in a mean value if the newly recorded road information data deviate less than a predetermined percentage from the mean value.

A recording is compared with road information data already existing in the local database, wherein it can be decided if, and how the recording shall be saved. A high deviation between a recorded road information data and an existing, mean value in the local database can be caused by an erroneous recording or a change of the route. However, if a second recording deviates less than a second predetermined percentage from the first recording a new mean value is created from the these two recordings, whereby the new mean value is saved in the local database.

A transmission of road information data from the local database C to the fleet database is also made. This can be made continuously over a wireless communication link, or just when the vehicle is at a service station or similar.

The inventive method enriches the road information data in the describe manner. As new information is stored, the quality of the road information data in the databases (B, C) increases, wherein the next run of the same route can be made more effective. The road information data is enriched through new recordings as the vehicle is travelling and through updates of the quality rating of used road information data.

The invention claimed is:

1. Method of enrichment of road information data, wherein the road information data is used to control a drive train of a vehicle, and wherein the drive train is controlled by an electronic control unit (ECU), the ECU having access to road information data from a plurality of different types of road information sources (A, B, C), and a position sensor (P), wherein the road information sources (A, B, C) at least comprises; a digital map (A), a fleet database (B) and a local vehicle database (C), and wherein the ECU is adapted to make a selection between road information data from the plurality of road information sources (A, B, C), wherein the selection is based on a data quality rating of the road information data from the different road information sources (A, B, C), and the method comprising
    determining a position of the vehicle,
    collecting road information data, about possible routes in surroundings of the position of vehicle, from the plurality of road information sources (A, B, C),
    evaluating the data quality rating of the collected road information data,
    selecting the road information data with the highest data quality rating, and
    controlling at least one vehicle parameter, dependent of the selected road information data,
    recording road information data about a traveled route as the vehicle is moving, and during move of the vehicle, performing the steps of
        making a selection of relevant recorded road information data, and
        saving the relevant road information data to the local database (C).

2. Method according to claim 1, wherein the method also comprises
    determining a direction of travel of the vehicle, and
    thereby just collecting road information data for possible routes in the direction of travel of the vehicle.

3. Method according to claim 1, wherein the quality of the road information data is dependent on at least one of
    a source (A, B, C) of the road information data,
    an age of the road information data,
    an amount of records a mean value of the road information data is based upon,
    a spread of a mean value of the road information data, and
    a deviation between an expected outcome of the control of the at least one vehicle parameter and an actual outcome of the control of the at least one vehicle parameter.

4. Method according to claim 1, wherein the road information data for a route is saved in portions, and wherein only the road information data is saved for those portions of route, during which the inclination and/or direction of the road fulfil predefined conditions of increase of inclination and/or change of direction.

5. Method according to claim 1, wherein the road information data saved to the local database (C) is tagged with its date of recording.

6. Method according to claim 1, wherein if the local database (C) includes several recordings of the same route, a mean value of that route is formed from the several recordings.

7. Method according to claim 6, wherein the recordings are weighted in the calculation of the mean value, wherein recent recordings are weighted with a higher data quality rating than recordings of an older date.

8. Method according to claim 6, wherein a mean value with a low spread between the individual recordings becomes a higher data quality rating than a mean value with a higher spread between the individual recordings.

9. Method according to claim 1, wherein if the most recent recording of a route differs more than a predefined percentage from a mean value of the road information data for the route, the new recording is not included in the mean value, wherein the most recent recording is saved separately.

10. Method according to claim 9, wherein if both the most recent and the predetermined number of earlier recordings of a route differs more than a predefined percentage and about equally much from the mean value, a new mean value is calculated from the most recent and the number of earlier recordings of the route.

11. Method according to claim 1, wherein the recorded road information data about a route is incorporated into existing road information data about the route, in the local database (C).

12. Method according to claim 1, wherein a mean value from a high number of recordings becomes a higher data quality rating than a mean value based upon a lower number of recordings.

13. Method according to claim L, wherein data saved into the local database (C) is transmitted to the fleet database (B) and saved therein.

14. Method according to claim 1, wherein when recording road information data during driving of the vehicle, outer conditions, such as wind and weather are taken into consideration.

15. Method according to claim 1, comprising controlling the drive train based on the saved relevant road information data.

* * * * *